United States Patent [19]
Beuther et al.

[11] 3,941,683
[45] Mar. 2, 1976

[54] TWO STAGE METAL-CONTAINING OIL HYDRODESULFURIZATION PROCESS EMPLOYING AN ACTIVATED ALUMINA CATALYST IN THE SECOND STAGE

[75] Inventors: Harold Beuther, Gibsonia; Sun W. Chun, Murrysville; Angelo A. Montagna, Monroeville, all of Pa.

[73] Assignee: Gulf Research & Development Company, Pittsburgh, Pa.

[22] Filed: Apr. 24, 1974

[21] Appl. No.: 463,619

[52] U.S. Cl. .................................. 208/210; 208/216
[51] Int. Cl.² .......................................... C10G 23/02
[58] Field of Search ................ 208/210, 216, 89, 97

[56] References Cited
UNITED STATES PATENTS

| | | | |
|---|---|---|---|
| 3,242,101 | 3/1966 | Erickson et al. | 208/216 |
| 3,267,025 | 8/1966 | Gring et al. | 208/216 |
| 3,322,666 | 5/1967 | Beuther et al. | 208/216 |
| 3,340,180 | 9/1967 | Beuther et al. | 208/216 |
| 3,472,759 | 10/1969 | Masologites et al. | 208/97 |
| 3,652,449 | 3/1972 | Young et al. | 208/216 |

*Primary Examiner*—Delbert E. Gantz
*Assistant Examiner*—G. J. Crasanakis

[57] ABSTRACT

A two-stage process for hydrodesulfurization of a metal-containing hydrocarbon oil employing a hydrodesulfurization catalyst in the second stage having an activated support prepared by drying and calcining a crystalline alumina containing 1.2 to 2.6 mols of water of hydration per mol of alumina.

11 Claims, 1 Drawing Figure

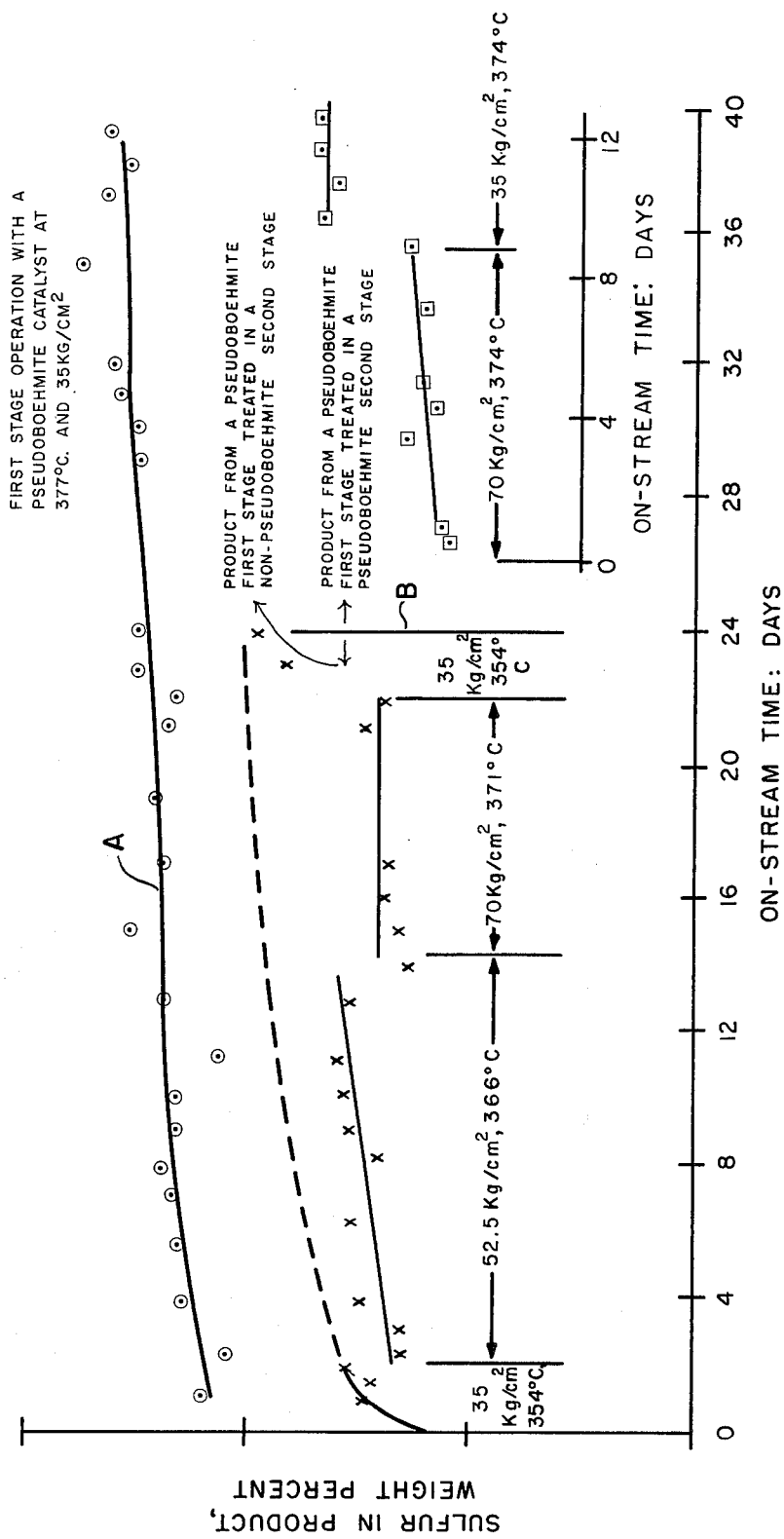

TWO STAGE METAL-CONTAINING OIL HYDRODESULFURIZATION PROCESS EMPLOYING AN ACTIVATED ALUMINA CATALYST IN THE SECOND STAGE

This invention relates to the use of an activated alumina supported hydrodesulfurization catalyst in the second stage of a process employing at least two reactor stages in series for the hydrodesulfurization of metal-containing and asphaltene-containing crude or residual petroleum oils. The invention applies to treatment of metal-containing hydrocarbon oils generally so that synthetic oils such as coal liquids, shale extracts and tar sand bitumens can also be treated. The activated alumina employed is referred to herein as pseudoboehmite.

The pseudoboehmite support for the second stage catalyst of this invention has a pore volume and average pore diameter which is generally lower than that of alumina supports of prevailing commercial crude or residual oil hydrodesulfurization catalysts, such as are employed in the first stage of the process of this invention. It would be expected that these characteristics would tend to reduce the useful life in hydrodesulfurization service of the pseudoboehmite catalyst for treating metal-containing oils, since metals deposition results in plugging and filling of pores which tends to deactivate small pore volume and small average pore diameter catalysts more rapidly than large pore volume and large average pore diameter catalysts.

In accordance with the present invention it has been discovered that a pseudoboehmite supported catalyst unexpectedly exhibits higher disulfurization activity than prevailing commercial hydrodesulfurization catalysts having a larger pore volume and average pore diameter when the pseudoboehmite catalyst is utilized in the second stage of the process of this invention. In the process of this invention a pseudoboehmite supported catalyst is employed at a high hydrodesulfurization activity for long throughput durations for the treatment of oils having high metals contents, that is, a nickel and vanadium metals level of at least 20 ppm, but particularly higher than 200 parts per million by weight.

In catalytic hydrodesulfurization of metal-containing oils, the desulfurization rate is primarily affected by the active metals on the catalyst support, i.e. by Group VI-B and Group VIII metals, by the process temperature and by the contact time. The alumina support of the catalyst does not itself possess desulfurization activity, but it does possess demetallization activity. In order for the alumina support to exert its demetallization activity, sufficient time must be allowed for the feed oil to become adsorbed on the alumina support. The present invention utilizes the discovery that pseudoboehmite alumina possesses very low demetallization activity when employed as a support for a residual oil hydrodesulfurization catalyst, especially at low oil residence times.

The pseudoboehmite catalyst of the present invention is characterized as a Group VI-B and Group VIII metal hydrodesulfurization catalyst supported on alumina wherein all or a major proportion of the alumina support is derived from a crystalline precursor alumina hydrate containing between about 1.2 and 2.6 mols of water of hydration per mol of alumina prior to calcining. The alumina support is essentially free of constituents which tend to impart cracking activity. Therefore, it contains less than 1 weight percent of silica, preferably less than 0.5 weight percent of silica, and can be essentially free of silica. This precursor itself is pseudoboehmite. The precursor hydrate can comprise pseudoboehmite entirely or in major part, with the remainder comprising other alumina hydrates, such as bayerite and/or gibbsite which are trihydrates. Pseudoboehmite and its method of preparation is disclosed in U.S. Pat. No. 3,188,174 and U.S. Pat. No. 3,222,273, which are hereby incorporated by reference.

The pseudoboehmite alumina supported catalyst of this invention has been subjected to comparative tests against various catalysts, all of which were supported on alumina which is free of pseudoboehmite. The pseudoboehmitefree aluminas were either derived entirely from a boehmite precursor, which is alumina monohydrate, or were derived from a precursor comprising boehmite in minor proportion together with bayerite in major proportion. Similar aluminas were employed in the non-pseudoboehmite first stage tests of this invention.

The operating conditions employed in each stage of the process of this invention comprise a temperature in the range from about 600° to about 1,000°F. (316° to 538°C.), and preferably from about 650° to about 800°F. (343° to 427°C.). The liquid space velocity can be in the range from about 0.1 to about 10.0, preferably less than about 5.0 and more preferably from about 0.2 to about 3.0 volumes of charge stock per volume of catalyst per hour. The hydrogen feed rate employed ranges from about 500 to about 10,000 standard cubic feet per barrel of feed stock (9 to 180 SCM/100L), preferably ranges from about 1,000 to 8,000 standard cubic feet per barrel (18 to 144 SCM/100L) and more preferably ranges from about 2,000 to about 6,000 standard cubic feet per barrel (36 to 128 SCM/100L). The hydrogen partial pressure is in the range from about 50 to about 5,000 psi (3.5 to 350 $Kg/cm^2$), preferably is less than about 3,500 psi (245 $Kg/cm^2$), and more preferably is less than about 2,500 psi (175 $Kg/cm^2$), with equally acceptable results in the pseudoboehmite stage being obtained with hydrogen partial pressures as low as 1,500, 1,000 or 900 or even lower than 500 or 400 psi (105, 70 or 63 or even lower than 35 or 28 $Kg/cm^2$). Hydrogen partial pressures of at least 200 psi (14 $Kg/cm^2$) are preferred. The total pressure generally does not greatly exceed the hydrogen partial pressures and can extend up to about 5,500 psi (385 $Kg/cm^2$), but preferably the total pressure is less than about 3,000 psi (210 $Kg/cm^2$).

The catalyst of the present invention comprises in minor proportion metalliferous hydrogenating compounds, including Group VI and Group VIII metals, their oxides and sulfides. In the pseudoboehmite stage the metals are composited with dried and calcined pseudoboehmite alumina. The preferable hydrogenating components are nickel, cobalt, platinum, palladium, molybdenum and tungsten. Preferred catalysts contain cobalt and molybdenum or nickel, cobalt and molybdenum or nickel, titanium and molybdenum. In the nonpseudoboehmite first catalyst stage of this invention, the alumina hydrate from which the alumina support is derived is sufficiently free of pseudoboehmite that the first stage catalyst exhibits the characteristics of a non-pseudoboehmite catalyst, as exemplified in tests presented below. The alumina hydrate from which the first stage catalyst is prepared is mostly free of pseudoboehmite, or is at least 80 or 90 weight percent free of pseudoboehmite, so that it can be characterized as essentially a non-pseudoboehmite alumina type.

The carrier or support for the pseudoboehmite supported catalyst of this invention can be a mixture of two different aluminas obtained by mechanically blending two different crystalline alumina hydrate precursors, one of which is an alumina trihydrate while most of the alumina is pseudoboehmite, i.e. a crystalline alumina hydrate containing from about 1.2 to about 2.6 mols of water of hydration per mol of $Al_2O_3$. For example, the alumina trihydrate can be employed in an amount from about 1 percent to about 35 percent weight, while the remainder can be pseudoboehmite. Preferably, the alumina trihydrate comprises 2 or 5 up to 18 or 30 percent by weight, based upon total alumina hydrate precursor. The preferred support is synthesized in one step as a mixture of the two precursors, as described in U.S. Pat. No. 3,846,285, hereby incorporated by reference.

The pseudoboehmite catalyst support of this invention is capable of hydrodesulfurizing a metals-containing residual oil with relatively low metals pick-up and therefore has superior aging characteristics providing extended catalyst life and, unexpectedly, is regenerable, i.e. relatively fresh catalyst activity can be achieved upon regeneration. The superior regenerability of the pseudoboehmite catalyst is illustrated in the aforesaid U.S. Pat. No. 3,846,285.

Regeneration of the pseudoboehmite catalyst can be accomplished either by solvent extraction with an aromatic solvent, preferably one containing a good hydrogen transfer agent such as hydrofuran and anthracene, or by oxidative burn-off. The solvent extraction can be accomplished in the presence of at least about 500 SCF of hydrogen per barrel of solvent (9 SCM/100L), at pressures of about 250 psi (17.5 Kg/cm²), or greater and at temperatures of about 500°F. (260°C.) or greater. The liquid hourly space velocity employed is usually greater than about 0.1 volume of solvent per volume of catalyst per hour. Somewhat more severe conditions are employed for the solvent treatment, such as pressures of at least about 500 psi (35 Kg/cm²) and advantageously greater than about 1,000 psi (70 Kg/cm²), temperatures of at least about 700°F. (371°C.), hydrogen feed rates of at least about 1,000 standard cubic feet per barrel (18 SCM/100L) of solvent and liquid hourly space velocities of at least about 0.2 volumes of solvent per volume of catalyst per hour. Generally, there is no advantage in employing pressures greater than about 3,000 or 4,000 psi (210 or 280 Kg/cm²), temperatures greater than about 900°F. (482°C.), space velocities greater than about 2.0 or hydrogen feed rates greater than about 10,000 standard cubic feet per barrel (180 SCM/100L). Normally, the regeneration by solvent treatment is accomplished within about 20 to 30 hours. The oxidative burn-off can be accomplished by techniques well known in the art and the temperature can preferably be maintained at a level of 800°F. (427°C.) or lower.

It has now been discovered that as hydrodesulfurization reaction temperatures increase, although the desulfurization reaction rate increases, when a pseudoboehmite catalyst support is employed the demetallization rate is especially low, indicating that desulfurization occurs preferentially to demetallization. At high temperatures, the desulfurization rate is high primarily because the adsorption and desorption rate of the high sulfur-containing asphaltene and resin molecules in crude and residual oils is rapid. Because of this phenomenon, the time that the asphaltenes reside on the catalyst surface is too short for the more tenaciously held nickel and vanadium to be removed. Rapid desulfurization reaction rates cause resin and asphaltene molecules, which are the high metal-containing molecules as well as the high sulfur-containing molecules, to depart rapidly from the catalyst surface, thus avoiding sufficient residence times at catalyst sites to allow for adsorption and significant demetallization of these molecules on the catalyst support. Therefore, employment of high desulfurization temperatures rapidly completes the desulfurization reaction, permitting metal-containing asphaltene molecules to leave catalyst sites before occurrence of excessive adsorption onto the alumina support with resulting demetallization.

In a process for residual oil hydrodesulfurization in two stages in series with an interstage flash for removal of contaminant by-product gases such as hydrogen sulfide, ammonia and gaseous hydrocarbons and with progressively increasing temperatures in each stage to compensate for catalyst aging as the cycle duration progresses, it has been found that the aging rate is considerably more rapid in the second stage than in the first stage. In the first stage, peripheral alkyl groups on feed asphaltene and resin molecules provide steric hindrance which tends to prevent contact of the polycondensed ring inner body of the residual molecules with the catalyst. Since the peripheral alkyl groups constitute the least refractory portion of the molecule, lengthy residence time of the polycondensed rings inner body on the catalyst surface is avoided in the first stage reaction. However, in the second stage, the remaining sulfur and metals in the asphaltene molecules are more refractory since they tend to be deeply imbedded in the aromatic nucleus. Also, since the asphaltene molecules have been dealkylated in the first stage the molecules are sterically better adapted to permit the aromatic nucleus to abut broadly against the catalyst sites. Therefore, with low start-of-run temperatures in the first and second stages, the second stage exhibits higher start-of-run aging rates and the second stage catalyst is more prone to coking at start-of-run, as compared to the first stage. The first stage can safely operate at low start-of-run temperatures without coking because of the described steric hindrance effect, although it is not advantageous for the second stage to operate at low start-of-run temperatures. The second stage advantageously utilizes higher start-of-run temperatures than does the first stage in order to reduce start-of-run coking and demetallization rates and in order to avoid a high resulting initial aging rate. Therefore, in the two stage residual oil hydrodesulfurization process of this invention, the second stage is preferably operated at higher start-of-run or initial temperatures than the first stage because the molecules in the effluent from the first stage lack the steric hindrance of alkyl groups to avoid excessive coking at low start-of-run second stage temperatures. Similarly, at any given time in a catalyst cycle, the second stage temperature is advantageously higher than the first stage temperature.

A series of tests were performed to illustrate this temperature effect and to show the superiority of pseudoboehmite as a catalyst support in the second stage of a two-stage petroleum residual oil hydrodesulfurizing process wherein the feed to the second stage is the effluent of a first hydrodesulfurization stage employing a non-pseudoboehmite catalyst support. Table 1 shows the characteristics of a typical 53 percent reduced Kuwait crude feed to a first non-pseudoboehmite hydrodesulfurization stage and also shows the characteristics of the same reduced crude after being processed over the non-pseudoboehmite alumina catalyst in the first stage and prior to being charged to a second stage employing a pseudoboehmite supported catalyst.

and also shows the results of second stage treatment of the first stage effluent shown in Table 1 when employing in the second stage a non-pseudoboehmite catalyst of the type employed in the first stage.

TABLE 1

Inspections of Feed Stocks to First and Second Stages

| Feed Stock | 53% Reduced Kuwait Crude Feed to First Stage | Feed to Second Stage Effluent from First Stage Employing a Non-Pseudoboehmite Catalyst) |
|---|---|---|
| Inspections | | |
| Gravity, °API | 15.1 | 22.2 |
| Viscosity, SUS, 100°F.(38°C.) | 4882 | 652 |
| 130°F.(54°C.) | 1439 | — |
| 210°F.(99°C.) | 184.6 | 69 |
| Sulfur, Weight % | 4.06 | 0.97 |
| Nitrogen, Weight % | 0.23 | 0.16 |
| Carbon Res., Rams, Weight % | 8.92 | 4.44 |
| Total Insol., Weight % | 6.36 | 2.87 |
| Nickel, ppm, Weight | 18 | 4.3 |
| Vanadium, ppm, Weight | 57 | 9.6 |
| Carbon, Weight % | 84.32 | 86.68 |
| Hydrogen, Weight % | 11.24 | 12.15 |
| Volume % Vacuum Distillation Temperature, °F., 10 mmHg | | |
| 5 | 628 (311°C.) | 543 (284°C.) |
| 10 | 688 (364°C.) | 596 (313°C.) |
| 20 | 769 (410°C.) | 676 (358°C.) |
| 30 | 833 (445°C.) | 744 (396°C.) |
| 40 | 887 (475°C.) | 807 (431°C.) |
| 50 | 947 (508°C.) | 868 (464°C.) |
| Cracked at, °F. | 962 (517°C.) | 1000 (538°C.) |

Table 2 shows the characteristics of the product obtained when the effluent from the first non-pseudoboehmite catalyst stage, illustrated in Table 1 is processed at various severities over a non-pseudoboehmite supported catalyst in the second stage.

TABLE 2

| | Feed | 375°F.+ (191°C.+)Products From Second Stage Employing a Non-Pseudoboehmite Catalyst | | |
|---|---|---|---|---|
| Sulfur, weight % | 0.97 | 0.5 | 0.3 | 0.1 |
| Nitrogen, weight % | | 0.14 | 0.13 | 0.11 |
| Nickel, ppm | 4.3 } 13.9 | 2.5 } 6.0 | 1.1 } 1.9 | 0.2 } 0.3 |
| Vanadium, ppm | 9.6 | 3.5 | 0.8 | 0.1 |
| Gravity, °API | | 23.8 | 24.5 | 26.0 |
| Vol. % Vacuum Distillation Temperature, °F., 10 mmHg | | | | |
| 5 | | 479(248°C.) | 468(242°C.) | 464(240°C.) |
| 10 | | 548(287°C.) | 543(284°C.) | 541(283°C.) |
| 20 | | 646(341°C.) | 639(337°C.) | 636(336°C.) |
| 30 | | 734(390°C.) | 726(386°C.) | 724(384°C.) |
| 40 | | 792(422°C.) | 788(420°C.) | 778(414°C.) |
| 50 | | 841(450°C.) | 842(450°C.) | 832(444°C.) |
| 60 | | 913(490°C.) | 905(485°C.) | 893(478°C.) |
| 70 | | 1,015(546°C.) | 981(527°C.) | 963(517°C.) |
| 80 | | — | — | 1,048(565°C.) |
| Carbon Residue (Ram), weight % | | 3.8 | 3.3 | 2.2 |
| Heat of Combustion: Btu/lb | | 19,200 (10,560 cal/gm) | 19,250 (10,588 cal/gm) | 19,350 (10,643 cal/gm) |
| Pour Point: °F. | | 40(4°C.) | 20(−7°C.) | 0(−18°C.) |
| Viscosity: SUV at °F. | | | | |
| 100 | | 430(221°C.) | 435(224°C.) | 320(160°C.) |
| 210 | | 60(16°C.) | 55(13°C.) | 53.5(12°C.) |
| Yeild: Vol. % of HDS Charge | | 98.8 | 98.6 | 98.6 |
| Desulfurization, weight % | | 48.5 | 69.1 | 89.7 |
| Demetallization, weight % | | 56.8 | 86.3 | 97.8 |
| %Demetallization/%Desulfurization | | 1.17 | 1.25 | 1.09 |

Table 3 shows the results of second stage treatment of the first stage effluent shown in Table 1 when employing a pseudoboehmite supported catalyst comprising 0.5 weight percent nickel, 1 weight percent cobalt and 8 weight percent molybdenum in the second stage

TABLE 3

| Second Stage Catalyst Supported on Pseudoboehmite | | Second Stage Catalyst Supported on Non-Pseudoboehmite Alumina | |
|---|---|---|---|
| Product sulfur, weight % | | | |
| 0.5 | 0.3 | 0.5 | 0.3 |
| LHSV, Hr⁻¹ in second stage | | | |
| 2 | 1 | 1.0 | 0.5 |

Table 3 shows that the use of a pseudoboehmite supported catalyst in the second stage provides unusually high desulfurization activity when treating the residual oil effluent from a first stage employing a non-pseudoboehmite alumina support so that a reduced quantity of catalyst or a higher space velocity with the same quantity of catalyst can be employed in the second stage as compared to the first stage. Table 3 shows that use of a pseudoboehmite supported second stage The great ability of the pseudoboehmite catalyst to reject essentially all metals in second stage operation, as shown in Table 4, is surprising because, as shown in Table 5, a similar ability to reject metals is not observed when a pseudoboehmite catalyst is employed in first stage operation.

TABLE 5

First Stage Operation at 500 psig (35 Kg/cm$^2$), 700°F. (371°C.), 500 SCF H$_2$/Bbl (9 SCM/100L)

|  | Pseudoboehmite Catalyst |  | Non-Pseudoboehmite Catalyst |
|---|---|---|---|
| Supported Metals, weight % | 0.5Ni,1Co,8Mo | 0.5Ni,1Co,8Mo | 4.5Ni,12Mo,5Ti |
| LHSV, Hr$^{-1}$ | 0.5 | 1 | 1 |
| On-Stream Time, Hours | 205 – 301 | 8 – 72 | 359 – 407 |
| Desulfurization, percent | 62(0.78)[1] | 61(1.04)[1] | 39(1.60)[1] |
| Demetallization, percent | 32(167)[2] | 34(230)[2] | 20(134)[2] |
| Deasphalting, percent | 20 | 3 | 12 |
| %Demetallization/%Desulfurization | 0.52 | 0.56 | 0.51 |

[1] Sulfur remaining in the 50 percent reduced crude
[2] Metals remaining in the 50 percent reduced crude catalyst reduces required second stage residence time by one-half (i.e. permits double the space velocity) to provide a given product sulfur level as compared to use of a non-pseudoboehmite catalyst in the second stage. Therefore, it is possible to employ only one-half the amount of catalyst in the second stage at a given flow rate when employing a pseudoboehmite second stage catalyst, as compared to the amount of catalyst required when employing a non-pseudoboehmite second stage catalyst to achieve a given effluent sulfur level. Since the second stage pseudoboehmite supported catalyst removes very little metals from the stream being treated, its high desulfurization activity is due in large part to its high ability to resist deactivation due to coking.

Table 4 shows the effluent of changing various parameters in second stage operation when employing a pseudoboehmite catalyst for treatment of the non-pseudoboehmite first stage effluent described in Table 1.

Table 5 shows that in the first stage the pseudoboehmite and non-pseudoboehmite catalysts both exhibit about the same demetallization to desulfurization ratio at the conditions tested, and the ratio in the first stage is much higher than the demetallization to desulfurization ratio in the second stage with a pseudoboehmite supported catalyst, as illustrated in Table 4. Therefore, use of the pseudoboehmite catalyst in first stage operation does not provide any suggestion of its great ability to reject metals when employed in second stage operation. The discovered ability of the second stage pseudoboehmite catalyst to reject metals contributes greatly to the regenerability of the pseudoboehmite second stage catalyst.

The FIGURE presents graphs of data illustrating use of a pseudoboehmite catalyst.

Referring to the FIGURE, curve A shows first stage aging data employing a pseudoboehmite first stage catalyst at 710°F. (377°C.) and 500 psi (35 Kg/cm$^2$). All curves disposed beneath Curve A represent second

TABLE 4

Effluent from Second Stage Employing a Pseudoboehmite Catalyst for Processing the Product from a Non-Pseudoboehmite First Stage

|  | Feed to Second Stage | 2000 psi (140 Kg/cm$^2$), 1 LHSV | | | 700°F. (371°C.), 0.5 LHSV | | |
|---|---|---|---|---|---|---|---|
| Temperature, °F. | — | 675 (375°C.) | 700 (371°C.) | 725 (385°C.) | — | — | — |
| Pressure, psi | — | — | — | — | 500 (35Kg/cm$^2$) | 1000 (70Kg/cm$^2$) | 2000 (140Kg/cm$^2$) |
| Product |  |  |  |  |  |  |  |
| Gravity, °API | 22.2 | 23.3 | 23.7 | 24.4 | 22.1 | 23.3 | 24.5 |
| Hydrogen, weight % | 12.15 | 12.45 | 12.50 | 12.6 | 12.23 | 12.46 | 12.64 |
| Sulfur, weight % | 0.97 | 0.45 | 0.34 | 0.28 | 0.53 | 0.35 | 0.22 |
| Ni+V, ppm weight | 13.9 | 13.3 | 12.9 | 12.0 | 13.9 | 13.3 | 11.1 |
| Desulfurization, % | — | 53.6 | 64.9 | 71.1 | 45.4 | 63.9 | 77.3 |
| Demetallization, % | — | 4.3 | 7.2 | 13.7 | 0 | 4.3 | 20.1 |
| %Demetallization/%Desulfurization | — | 0.08 | 0.11 | 0.193 | 0 | 0.067 | 0.26 |

Table 4 shows that under all conditions tested, the pseudoboehmite supported catalyst in the second stage accomplishes desulfurization with a relatively low accompanying demetallization level. This is contrasted with the data of Table 2 showing that the non-pseudoboehmite alumina in the second stage removes sulfur with a relatively high accompanying demetallization level.

stage operation at the conditions indicated in the FIGURE, with all curves to the left of vertical line B representing product from a pseudoboehmite first stage operation treated in a non-pseudoboehmite second stage, while the curves to the right of vertical line B represent product from a pseudoboehmite first stage operation treated in a pseudoboehmite second stage.

The FIGURE shows that if a pseudoboehmite catalyst is utilized in the first stage, the difference between utilizing a non-pseudoboehmite catalyst or a pseudoboehmite catalyst in the second stage is not great. This is in sharp contrast to the data presented in Table 3, above, which show that when employing a non-pseudoboehmite catalyst in the first stage, the advantage of employing a pseudoboehmite catalyst in the second stage (compared to a non-pseudoboehmite catalyst in the second stage) is about twofold.

We claim:

1. A process of hydrodesulfurizing a metalcontaining hydrocarbon feed oil at a temperature between 600° and 1,000°F., and a hydrogen pressure between 50 and 5,000 psi comprising passing said feed oil and hydrogen through first and second hydrodesulfurization zones in series with interzone removal of gaseous by-products, the catalyst in said second zone comprising Group VI-B and Group VIII metals supported on a first alumina said first alumina being prepared by drying and calcining a crystalline alumina hydrate having 1.2 to 2.6 mols of water of hydration per mol of alumina, the catalyst in said first zone comprising Group VI-B and Group VIII metals supported on a second alumina, said second alumina being prepared by drying and calcining an alumina hydrate selected from the group consisting of alumina monohydrate and alumina trihydrate, and maintaining the temperature in said second zone higher than the temperature in said first zone.

2. The process of claim 1 wherein said crystalline alumina hydrate of said first alumina includes a minor amount of alumina hydrate selected from the group consisting of bayerite, gibbsite and mixtures thereof.

3. The process of claim 1 wherein the space velocity is higher in the second zone than in the first zone.

4. The process of claim 1 wherein the quantity of catalyst in the second zone is less than the quantity of catalyst in the first zone.

5. The process of claim 1 wherein the hydrogen pressure is below 1,500 psi.

6. The process of claim 1 wherein the hydrogen pressure is below 500 psi.

7. The process of claim 1 wherein the hydrogen pressure is 200 to 400 psi.

8. The process of claim 1 wherein the feed oil contains at least 20 parts per million by weight of nickel plus vanadium.

9. The process of claim 1 wherein the feed oil contains at least 200 parts per million by weight of nickel plus vanadium.

10. The process of claim 1 including regeneration of the second zone catalyst.

11. The process of claim 1 wherein the feed oil is a residual petroleum oil.

* * * * *